United States Patent [19]
Hughes et al.

[11] Patent Number: 5,247,010
[45] Date of Patent: Sep. 21, 1993

[54] COMPACTIBLE BENZIMIDAZOLE POLYMERIC COMPOSITIONS

[75] Inventors: O. Richard Hughes, Chatham; Dieter Kurschus, Bayville, both of N.J.

[73] Assignee: Hoechst Celanese Corp., Somerville, N.J.

[21] Appl. No.: 810,663

[22] Filed: Dec. 19, 1991

[51] Int. Cl.$^5$ ............... C08L 79/00; C08L 77/06; C08F 6/10
[52] U.S. Cl. ................... 524/606; 524/607; 525/435; 528/491; 528/502
[58] Field of Search ............ 524/606, 607, 608; 528/491, 501, 502; 525/435

[56] References Cited

U.S. PATENT DOCUMENTS

| | | | |
|---|---|---|---|
| 4,628,067 | 12/1986 | Chen, Sr. et al. | 521/25 |
| 4,717,619 | 1/1988 | Letinski | 524/606 |
| 4,828,178 | 5/1989 | Tucker et al. | 239/223 |

OTHER PUBLICATIONS

G. W. Halldin & M. R. Shah, *Compaction of Polymer Powders* SPE, 39th ANTEL, Boston May 4-7, 1981 pp. 353-355.
George E. Long, AMP Inc. *Spraying Theory and Practice* "Chemical Engineering" Mar. 13, 1978 pp. 73-77.
S. C. Tsai, B. Viers, and D. Botts, *Effects of Pseudoplastic Behavior in Airblast Atomization of Viscous Liquids* ASME Fluids Eng. Div. (1988) vol. 75 pp. 225-231.

Primary Examiner—Paul R. Michl
Assistant Examiner—Tae H. Yoon
Attorney, Agent, or Firm—Joseph M. Mazzarese

[57] ABSTRACT

A cold compactible polymeric powder capable of being compressed into a shaped article includes a polybenzimidazole containing powder having an apparent density ranging from about 0.14 to about 0.300 gm/cm$^3$, a compaction constant ranging from about 0.100 to about 0.500 MPa$^{-1}$, and a plasticizer content ranging from about 1 to about 25 weight percent The highly porous polymeric powders are preferably formed by dissolving polymeric resins in a suitable solvent to form a polymeric solution, and atomizing the solution into a droplet atmosphere of a non-solvent.

19 Claims, 3 Drawing Sheets

COMPACTIBLE BENZIMIDAZOLE POLYMERIC COMPOSITIONS

CROSS REFERENCE TO RELATED APPLICATION

The subject matter of this case is related to that of the copending application entitled "HIGHLY POROUS COMPRESSIBLE POLYMERIC POWDERS", application U.S. Ser. No. 07/810,611, now U.S. Pat. No. 5,147,895 filed of even date herewith.

FIELD OF INVENTION

The present invention relates to processes for forming polymeric compactible compositions suitable for sintering. The powders employed in accordance with the present invention are preferably those containing a polybenzimidazole (PBI) resin prepared by atomization/quenching as hereinafter described.

BACKGROUND OF THE INVENTION

A desirable group of polymers are those that retain excellent mechanical properties at high temperatures. However, polymers in this group often melt at very high temperatures or decompose without melting. In addition their viscosities in the melt phase are extremely high. Therefore, these polymers are considered to be intractable, that is, not melt processable. Thus, forming these polymers into shaped articles is expensive at best and impossible in many cases.

For example, nylons of hexamethylene diamine and terephthalic acid exhibit excellent temperature resistance but cannot be melt-spun or molded because they decompose before their crystalline melting temperatures are reached. Likewise, many other wholly aromatic polymers such as polyimides of pyromellitic anyhydride and aromatic diamines cannot be melt-processed in polyamic acid or fully imidized form. Powder processing and sintering techniques have been used to process such intractible polymers into useable articles.

Specifically, polymeric particulate matter can be compacted into green bodies and sintered thereafter. Compaction behavior of polymeric particulates is referred to in "Compaction of Polymer Powders" by G. W. Halldin et al. SPE, 39th ANTEC, Boston, MA, May 4-7, 1981, pages 353-355 herein incorporated in its entirety. Halldin studied the density of green bodies as a function of compaction pressure, and among other things, concluded that the strength of an unsintered body is determined by its density. Generally speaking, there is an upper limitation of compaction pressure where increasing the pressure will not increase the density of the object, i.e., plateau density.

Halldin concluded that the compressibility of polymer powders can be best modeled by the equation:

$$\rho^* = \rho^*_p - (\rho^*_p - \rho^*_a) \exp(-kP)$$

wherein $\rho^* = \rho_g/\rho_t$, $\rho$ = green density, gm/cm$^3$, and $\rho_t$ = theoretical density, gm/cm$^3$; $\rho^*_p$ = relative plateau density; $\rho^*_a$ = relative apparent density; k = compaction constant; and P = compaction pressure. The compaction constant, k, has units which are the reciprocal of the pressure units, for example, if P is expressed as Pa, k is expressed as Pa$^{-1}$ or if P is expressed as psi, k is expressed as psi$^{-1}$. According to the equation, as the compaction constant of a green body, k, approaches a value of 1.0 MPa$^{-1}$, less compaction pressure, P, is required to produce a green body having a green density, $\rho_g$, which approaches its theoretical (or true) density, $\rho_t$ according to "Powder Surface Area And Porosity" by S. Lowell & J. E. Shields, Chapman & Hall, 3rd. ed., 1991, p. 227. However, as the value of k decreases, more compaction pressure is required to produce a green body having a density which approaches the theoretical density. Some polymer powder, e.g., ultra high molecular weight polyethylene (UHMWPE), are readily compressed and exhibit k values approaching 1 MPa. Other polymer powders are not as readily compressible and exhibit k values as low as 0.01 MPa. The apparent density as measured by ASTM No. D-1895-89 is the density that the powder exhibits in its free flowing state.

SUMMARY OF THE INVENTION

It has been found that a composition including a polybenzimidazole containing (PBI) powder and a plasticizer exhibits superior compaction behavior. Preferred embodiments utilize a PBI powder having a plasticizer content of about 1 to about 25 weight percent such that the composition exhibits a cold compressibility characterized by a compaction constant, k, ranging from about 0.100 to about 0.500 MPa$^{-1}$, and an apparent density ranging from about 0.100 to about 0.300 gm/cm$^{-1}$. The preferred plasticizer is water, and the preferred PBI resin is poly-2,2'-(m-phenlyene)-5,5'-bibenzimidazole. The PBI resin may be the sole resin employed in the powder or used in combination with another resin, for example, solution blended with a polyester or polyimide resin prior to powder preparation.

BRIEF DESCRIPTION OF THE DRAWINGS

While the specification concludes with claims particularly pointing out and distinctly claiming the present invention, it is believed that the present invention will be better understood from the following description in conjunction with the accompanying drawings in which:

DETAILED DESCRIPTION OF THE INVENTION

Figure 1:
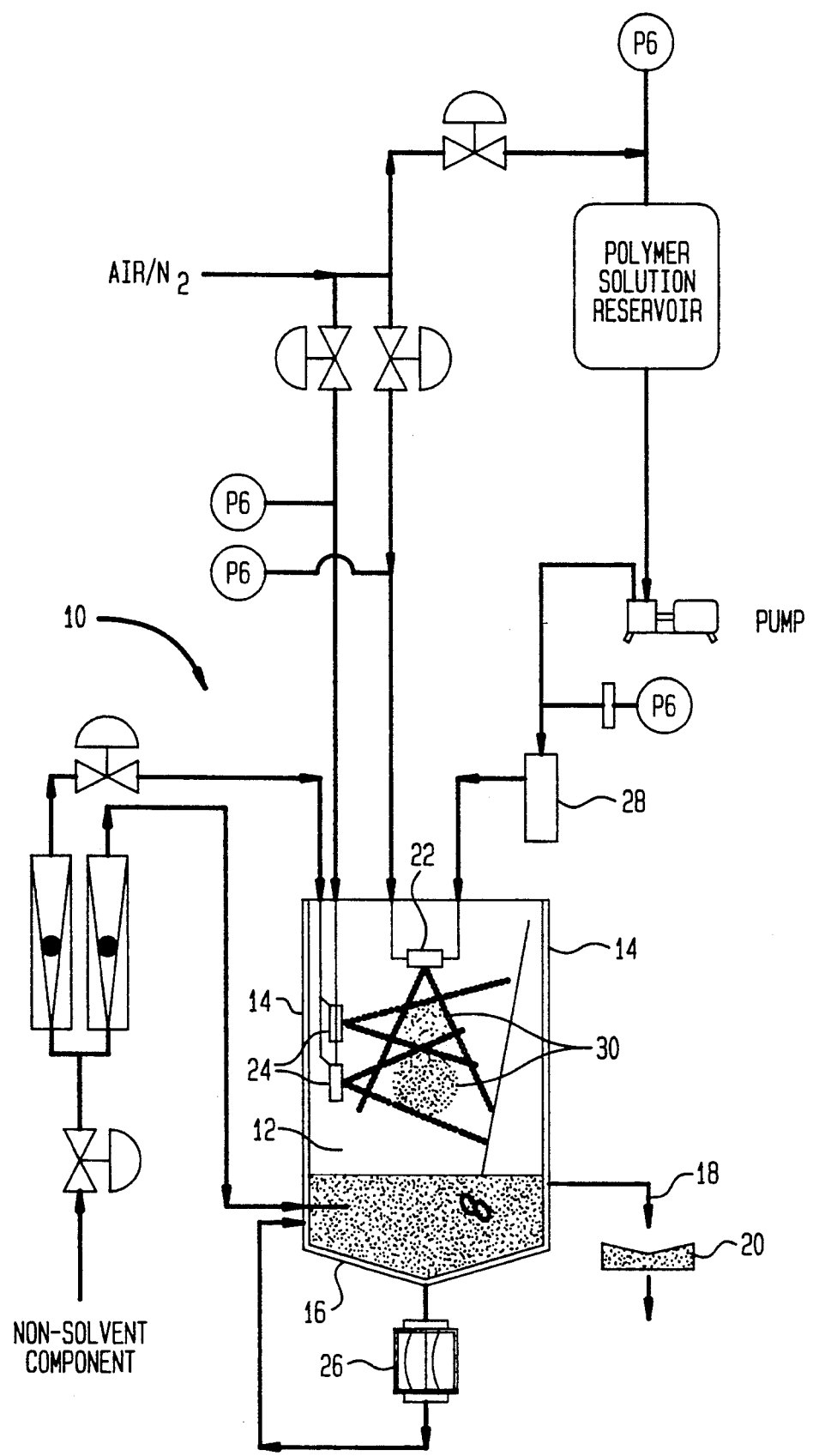
FIG. 1 is a schematic view in elevation of an atomization reactor system utilized to form the highly porous particles of the invention.

It has been discovered that two properties are desirable with respect to compactible polymeric containing PBI powders:

1) internal porosity of the particle; and
2) plasticizer content.

Previously, it was not realized that moisture content would affect compressibility of polymeric compositions, or that it could serve as a plasticizer for aiding cold compaction of powders produced therefrom. On the contrary, moisture has been known to substantially degrade the molecular structure of certain intractable polymers.

Polymers useful in the highly porous powders of this invention may comprise any polybenzimidazole resins known to those skilled in the art. Typical polymers of this class and their preparation are more fully described in U.S. Pat. No. 2,895,946; U.S. Pat. No. Re. 26,065; and the *Journal of Polymer Science*, Vol. 50, pages 511-539 (1961), which are herein incorporated by reference. These polybenzimidazoles consist essentially of recurring units of the following Formulae I and II.

Formula I is:

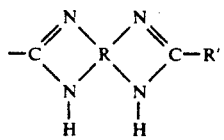

wherein R is a tetravalent aromatic nucleus, preferably symmetrically substituted, with the nitrogen atoms forming the benzimidazole rings being paired upon adjacent carbon atoms, i.e., ortho carbon atoms of aromatic nucleus, and R' is selected from the group consisting of (1) an aromatic ring, (2) an alkylene group, and (3) a heterocyclic ring selected from the group consisting of (a) pyridine, (b) pyrazine, (c) furan, (d) quinoline, (e) thiophene, and (f) pyran.

Formula II is:

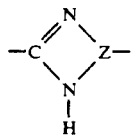

wherein Z is an aromatic nucleus having the nitrogen atoms forming the benzimidazole ring paired upon adjacent carbon atoms of the aromatic nucleus.

Preferably, aromatic polybenzimidazoles are selected from polymers consisting essentially of the recurring units of Formulae I and II, wherein R' is at least one aromatic ring of a heterocyclic ring.

A preferred polybenzimidazole for use in the present invention is poly-2,2'-(m-phenylene)-5,5'-bibenzimidazole, the recurring unit of which is:

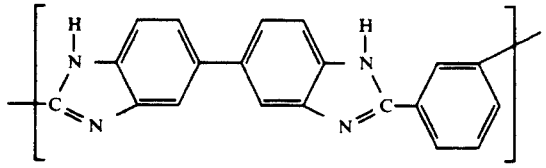

Representative techniques for preparing polybenzimidazoles are disclosed in U.S. Pat. Nos. 3,509,108; 3,549,603; and 3,551,389, which are assigned to the assignee of the present invention and are herein incorporated by reference.

While PBI-containing powders useful in connection with the present invention may be prepared by a variety of techniques, the atomization/quenching technique described below is particularly preferred.

The first step of the process involves forming a solution or dope of polymeric resin dissolved in a suitable solvent. The polymeric solution utilized herein generally contains from about 1 to about 25 percent by weight of polymer solids. Typically, however, the solution will contain from about 5 to about 20 percent by weight of polymer solids and preferably, from about 12 to about 15 percent by weight of polymer solids is utilized.

The resins are generally selected from the group consisting of polybenzimidazoles, polybenzimidazolones, polybenzoxazoles, polyesters, polyimides, polyamides, polyamideimides, partial and wholly aromatic aramides, nylons of hexamethylene diamine and terephthalic acid, polyarylketone, polyarylsulfide resins and mixtures thereof. Preferably, the resin solution will contain polybenzimidazole in combination with at least one of the aforementioned resins. Polymer component of the solution can be PBI alone or a blend of PBI with another polymer. Generally the PBI will be about 10 to about 100 weight % of the blend. Preferably, PBI will be about 20 to about 80 wt. % of the total polymer content. The other polymer can be polybenzimidazolones, polybenzoxazoles, polyesters, polyimides, polyamides, polyamideimides, partial and wholly aromatic aramides, nylons of hexamethylene diamine and terephthalic acid, polyarylketones, polyarylsulfides.

The solvents utilized to form the solution or dope include those solvents which are commonly recognized as being capable of dissolving the particular polymer resin being used. Illustrative examples of suitable solvents include N,N'-dimethylacetamide, N,N'-dimethyl formamide, dimethyl sulfoxide, and N-methyl-2-pyrrolidone. Additional representative solvents include formic acid, acetic acid, sulfuric acid, polyphosphonic acid and methanesulfonic acid. Particularly, the preferred solvent is N,N'-dimethylacetamide (DMAc) having a concentration of from about 90 to 100 percent and preferably about 99 percent by weight.

Methods of dissolving different polymers in a variety of solvents are known to those skilled in the art. One suitable method for dissolving polybenzimidazoles is by mixing and heating the materials at a temperature above the normal boiling point of the solvent, for example, about 25° to about 120° C. above such boiling point, and at a pressure from about 2 to about 15 atmospheres for a period from about 1 to about 5 hours. Preferred conditions will usually comprise heating the mixture in a stainless steel reactor at a pressure of about 7 atmospheres (for high molecular weight polymers, low molecular weight polymers require less pressure) for about 2 hours at a temperature of about 235° C. The resulting solution is then filtered to remove any undissolved resin. A minor amount of lithium chloride, e.g., about 2 percent by weight, can be added in the solution to prevent the polymeric resin from phasing out of the solution upon standing for extended periods of time.

The non-solvent component of the present invention is any substance which can be atomized or formed into an aerosol in which the polymer is insoluble. Any component in which the polymer is insoluble is sufficient. Typically, the non-solvent is a $C_1$ to $C_4$ alcohol or water. Preferably, the non-solvent component is water.

The polybenzimidazole powder produced by the process of the present invention, capable of being compressed into shaped articles has an ASTM No. D-1895-89 apparent density ranging from about 0.14 to about 0.18 gm/cm$^3$, a compaction constant ranging from about 0.100 to about 0.500 MPa$^{-1}$, and a plasticizer content ranging from about 1 to about 25 weight percent. Furthermore, the powder exhibits a porosity, as determined by mercury porosimetry (see Lowell & Shields, p. 217) ranging from about 0.5 to about 1.5 cm³/gm, a surface area, as measured by $N_2$ adsorption in the standard BET technique (see Lowell & Shields, p. 30), ranging from about 20 to about 80 m²/gm, a surface area a pore radius ranging from about 20 to about 600 Angstroms, a particle size ranging from about 1 to about 800 μm, and an angle of repose ranging from about 0 to about 40 degrees as measured by the method disclosed in Powders Technology Handbook, Chapter II.6, "Fluidity of Powder" by T. Yokoyama, 1st Ed. Marcel Dekker, New York (1991) pp 127–138.

An atomization reactor system, as illustrated in FIG. 1, is utilized to form the highly porous particles of the invention. The reactor system (10) has a cylindrical vessel (12) with upstanding side walls (14) and a cone-shaped bottom (16) with an outlet (18) equipped with a particle separation system (20). Typical reactor dimensions are about 36 inches in diameter by about 37 inches in height. A plurality of nozzles are contained within the reactor. The first set of nozzles (22), slidably attached to the top-center of the reactor, are utilized to atomize the resin solution downwardly into the reactor. A second set of nozzles (24), equaling about four times the quantity of the first nozzle set, separated into an equal number of rows (i.e., four), equally spaced and attached to the reactor side walls at positions well below the first nozzle set, are utilized to atomize the non-solvent component in a direction perpendicular to that of the polymer solution and horizontally into the reactor to create an aggregation zone. A recirculation pump (26) is positioned in the bottom of the reactor to maintain suspension of the rounded particles in the non-solvent solution prior to discharging through outlet (18).

The atomization nozzles, manufactured by Spraying Systems of Wheaton, Ill., produce a wide-angle rounded spray pattern using a No. 1 spray set-up containing Fluid Cap 2050 and Air Cap 64. Under normal operation at 60 psi the nozzles are capable of delivering 0.79 gallons of liquid per hour at a spray angle of about 18 degrees. The polymer solution is pumped from a reservoir through a filtering system (28) to remove undissolved resin before feeding it through the first inlet of the first set of nozzles (22). To aid atomization, a gas such as air or nitrogen is fed into a second inlet of each nozzle (22) as is typical of gas-operated atomization nozzles. Nozzles (22) are suspended along the upper-vertical axis of the reactor in such a way as to spray fine droplets of the resin solution down into the reactor. The non-solvent component (e.g., water or alcohol) is fed into a first inlet of each second set of nozzles (24) while a compressed gas such as air or nitrogen is fed into a second inlet of the second set of nozzle (24) to aid in atomization. If the solvent is not adequately diluted the precipitated particles will often remain soft and may agglomerate.

During operation of the reactor, a polymer solution aerosol jet is discharged from the first set of nozzles (22) downwardly into the atomized atmosphere of the non-solvent component, which is discharging horizontally into the aggregate (i.e., reaction) zone (30) in the form of an aerosol jet discharged from the second set of nozzles (24) to form highly porous particles. An initial quantity of non-solvent component, e.g., water, is accumulated in the reactor bottom to maintain suspension of the highly porous particles as they are formed, as well as to complete any residual precipitation from solution that may be necessary. Typically, the reactor is operated at atmospheric pressure, but other pressures are possible. The contents in the bottom of the reactor (i.e., polymeric particles suspended in the non-solvent component) are constantly recirculated to aid in suspension of the particles before discharging through outlet (18). To separate the suspended particles from the solvent/-non-solvent solution, the outlet of the reactor is typically equipped with a separation system (20). The separation system can comprise any of several methods known in the art including vacuum, gravity and pressure filtrations or centrifugation. For example, the particles can be collected on the filter and washed to remove residual solvent and non-solvent components, or the slurry can be centrifuged to produce a wet cake which can be washed and dried. The separated powder may be redispersed in water to remove additional residual solvent and separated again by any of the aforementioned means. The wet cake that results after filtration or centrifugation must be dried to a controlled or defined moisture content that assures adequate cold compactibility. One of several approaches can be adopted: 1) wet cake powder can be dried to low non-solvent content (<7 wt %) and humidified to the desired moisture content (7-12 wt %); or 2) the wet cake powder can be dried directly to the desired moisture content (i.e., the non-solvent is water).

There are several ways to control the size of the highly porous particles. For instance, size can be controlled by adjusting the viscosity of the polymer solution through control of nozzle temperature and/or polymer concentration in the solution and adjusting the amount of non-solvent component droplets in the atmosphere. Moreover, the particle size can be changed by adjusting pressure on the nozzle, especially the polymer solution nozzles (22). Thereafter, the dried, free-flowing highly porous particles can be milled and screened if so desired to produce submicron particles which produce an even higher apparent density powder which compress into high bulk density disks.

The polybenzimidazole powders produced by the method of this invention will generally exhibit a compaction constant, k, in accordance with Halldin's compressibility equation in the range of about 0.100 to about 0.500 $MPa^{-1}$. Generally, powders characterized by higher values of k, i.e., k approaching 1.0 $MPa^{-1}$, compress more readily. As the value of the compaction constant approaches 1.0 $MPa^{-1}$, less force and time are required to compress the powder into a dense shape.

Generally, when water is the plasticizer and polybenzimidazole is at least one of the resins the powder is humidified to a moisture content ranging from about 1 to about 25 weight percent water, typically, about 5 to about 20 weight percent water, and preferably, about 12 to about 15 weight percent water based on the total weight in preparation for the cold compaction process. While water is the preferred plasticizer, other components containing small molecules which are soluble in PBI may be useful, e.g., formic acid, carbon dioxide, phosphoric acid, hydrogen cyanide, methylamine, hydroxylamine, phosphine, ammonia, sulfuric acid, dimethlyacetamide, hydrochloric acid, hydrogen sulfate and hydrogen selenide. While many of these plasticizers are effective in improving cold compressibility, many of them are difficult to remove from the shaped polymeric article prior to sintering. A shaped article containing a volatile plasticizer can develop fractures when heated to quickly to sintering temperatures. If the plasticizer cannot diffuse out of the compressed part, it may volitilize as a gas pocket with sufficient pressure to create a fracture in the part.

Following the plasticization process, an amount of the polymeric powder can be shaped by pressing in a mold at pressures from about 3,000 to about 60,000 psi for dwell times ranging from about 1 second to about 10 minutes. After the predetermined dwell time has elapsed, the compaction pressure is released and the shaped article is removed from the mold. If the shaped article is to be sintered, any volatile plasticizer must be removed slowly. Moisture can be removed from shaped article by raising the temperature from about 80° to about 300° C. The time-temperature conditions of drying the shaped article must be done in a way to avoid generating defects (e.g., cracks, blisters, etc.) due to vaporization of volatiles in the article. The article can be dried in a nitrogen purged oven to remove any unwanted plasticizer and finally sintered to a near net shape.

The following examples are general illustrations of preparing highly porous PBI particles and cold compaction of shaped articles therefrom in accordance with the present invention; other polymeric particles can be produced using similar procedures. They are provided for purposes of exemplification only as should be appreciated from the foregoing discussion.

EXAMPLE I

Following the procedure described above, a 12 weight percent PBI was resin dissolved in DMAc, the PBI-DMAc solution was fed at 24.8 cm$^3$/min and 58 psi assisted by nitrogen at 40 psi into the first set of nozzles. After purging 75.7 kg of quenching water with N$_2$ for several days, 1528 gm of DMAc (about 2 wt. %) were added thereto. The water under a pressure of 40 psi was fed at a rate of 0.6 liters/min. into the second set of nozzles along with nitrogen at 10 psi. Highly porous PBI particles were formed and collected in the bottom of the reactor, screened, filtered, washed and dried in a planetary mixer at 1 atomsphere of N$_2$ for 52 hours at 200° C. Portions of the dried powder were exposed to atmospheres having relative humidities controlled at values in the range of 30 to 80 percent. This produced a set of powders having moisture contents in the range of 1 to 15 weight percent. Disks were shaped with pressure from 3 to 50 ksi. Densities of these disks were measured by mercury (Hg) immersion.

Figure 2:
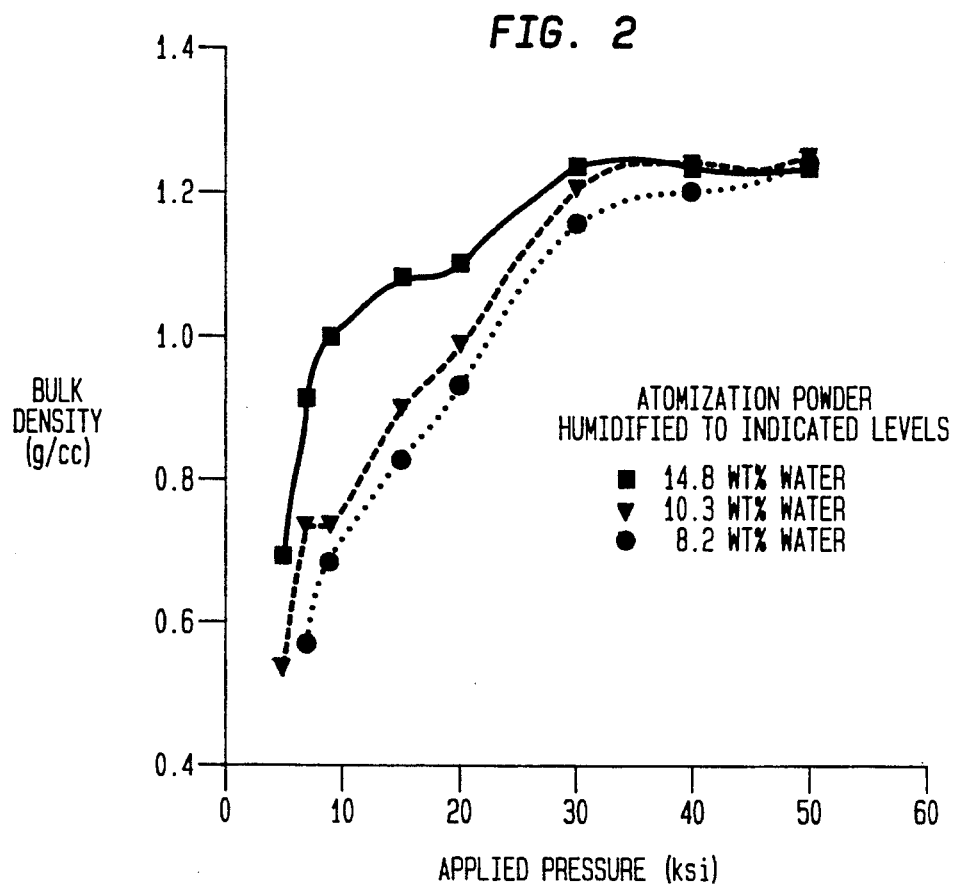
FIG. 2 is a compressibility curve of atomized porous PBI disks containing moisture levels of 8.2, 10.3 and 14.8 weight percents.

FIG. 2 is a plot of bulk densities of the disk versus the pressure of powders produced according to this process having 8.2, 10.3 and 14.8 weight percent moisture. Disks having the higher moisture content will generally exhibit the higher densities at an applied pressures.

Figure 3:
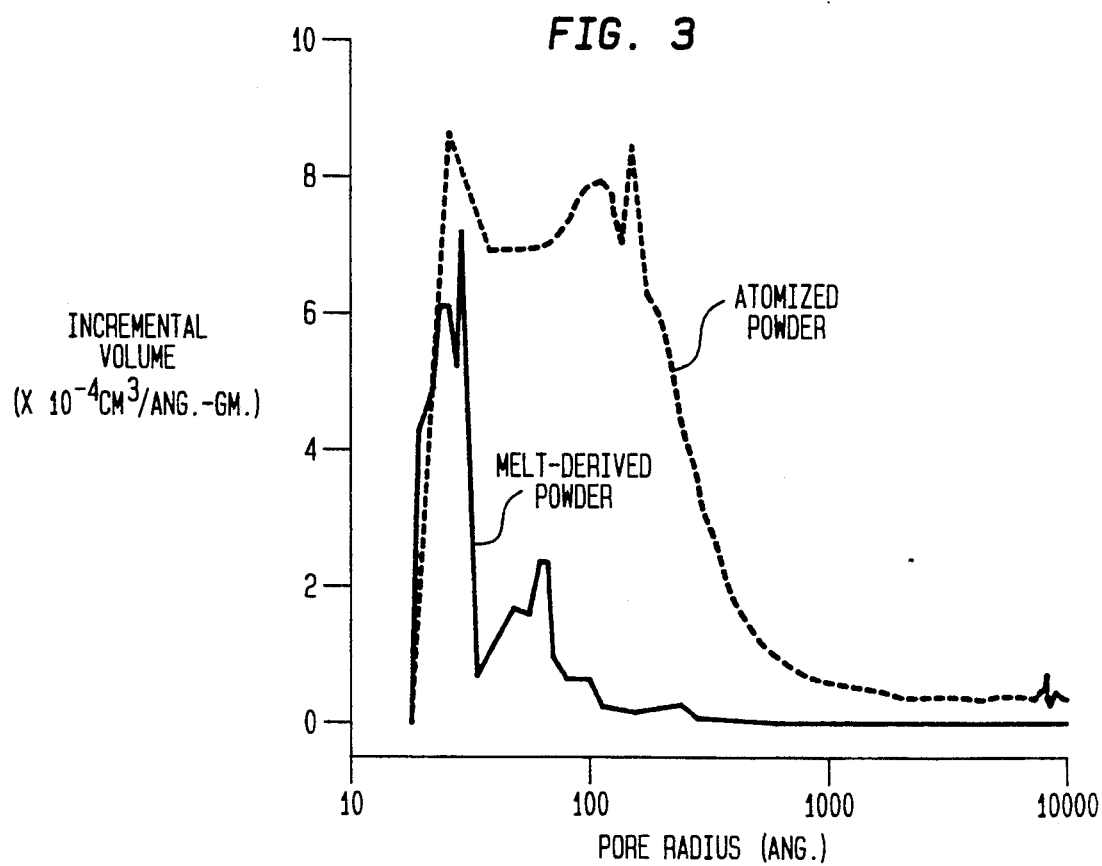
FIG. 3 is a plot illustrating the incremental pore volume versus pore radius of the particles useful in connection with this invention.

The atomized powders useful in connection with this invention are characterized by their significantly high open porosity. FIG. 3 represents a plot of the incremental pore volume versus the pore radius of melt-derived and atomized PBI powder. The total porosity, measured by mercury intrusion analysis, of the atomized powders range from 0.5 to 2.0 cm$^2$/gm of polybenzimidazole, however, the total porosity of melt-derived powder is typically only 0.02 cm$^2$/gm of polybenzimidazole. This internal porosity is believed to promote cold compaction by allowing the particles to crush and pack more efficiently. The cold compacted article has strength which is due in part to the enhanced mechanical interlocking that the crushed particles present compared to the uncrushed particles. The total pore volume of the atomized polybenzimidazole powder is 0.885 cm$^2$/gm, and the total pore volume of the melt-derived powder is 0.0213 cm$^2$/gm.

Figure 4:
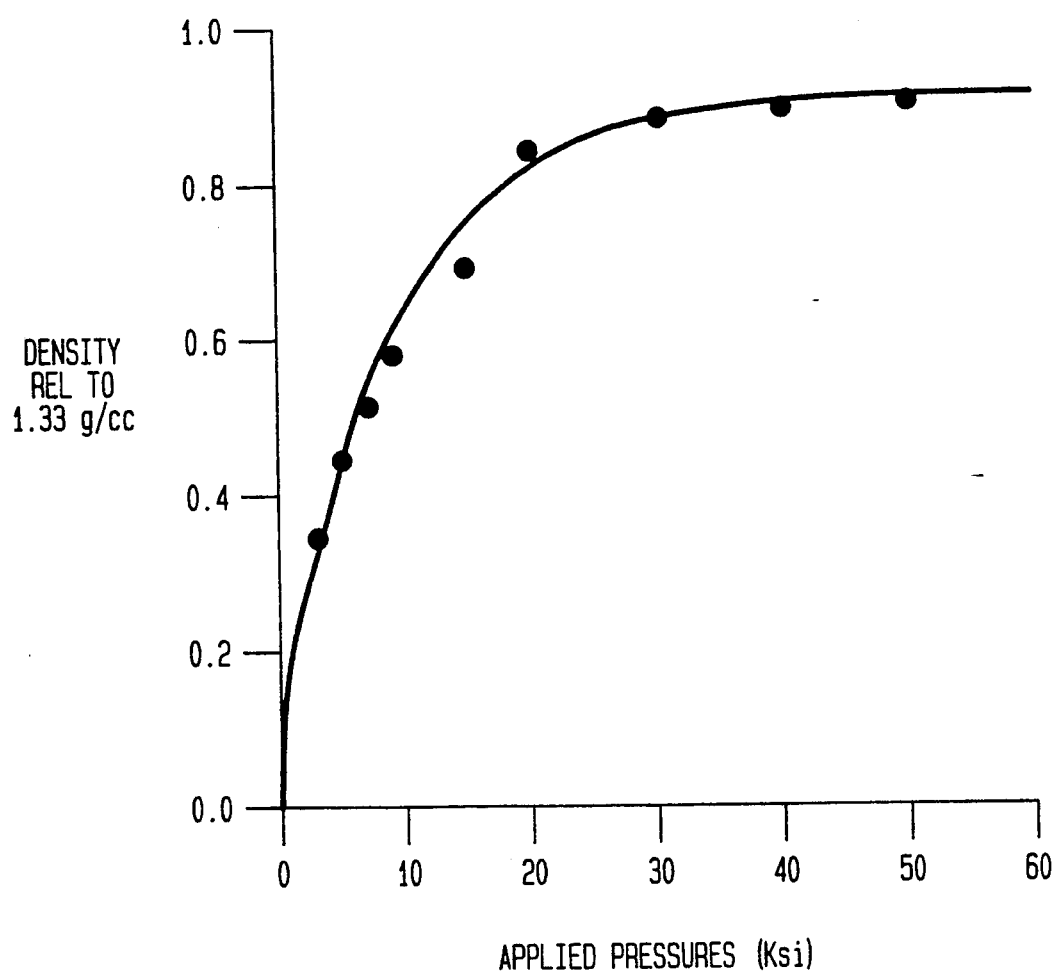
FIG. 4 is a compressibility curve of atomized, porous PBI disks containing moisture levels of about 13.1 weight percent.

FIG. 4 represents a compressibility curve for atomized polybenzimidazole powder produced according to this process which was compressed into disks; the water content of the powder was about 13.1 weight percent. The theoretical density of the powder, as measured by He pycnometry, was 1.33 gm/cm$^3$, the relative apparent density was 0.090 gm/cm$^3$, and the relative plateau density was 0.923 gm/cm$^{-1}$. The data points on the curve represent the relative densities of disks made at various applied pressures based upon a theoretical density. The compaction constant, k, calculated according to a best fit curve of the Halldin equation was about 0.11 ksi$^{-1}$ for PBI powder containing about 13.1 wt. % moisture made by the atomization process described herein.

EXAMPLE II

In another atomization of highly porous PBI particles similar to that of Example I, poly-2,'-(m-phenylene)-5,5'-benzimidazole (PBI) resin was dissolved into DMAc to produce a 12 weight percent PBI solids solution. The PBI solution was fed through a pumping system to nozzles in the reactor at about 12.4 cm$^3$/min and about 30 psi. Nitrogen gas at a pressure of about 15 psi was fed to the same nozzles to atomize the PBI solution. Quenching water (75,700 gm) was purged with nitrogen for 48 hours followed by the addition of 764 gm (1 wt. %) of DMAc. This water was fed to the atomization nozzles at a rate of 1080 cm$^3$/min and a pressure of 25 psi. Highly porous PBI particles were formed in the bottom of the reactor as a result of the operation, collected, centrifuged, washed and dried in a planetary mixer at 1 atomsphere N$_2$ for 70 hours at 200° C. A sieve analysis of the dried particles was performed. The data appears below in Table I.

TABLE I

| SIEVE ANALYSIS | |
|---|---|
| Sieve Size, μm | Wt. % Retention |
| 600 | 1.13 |
| 300 | 3.27 |
| 150 | 25.70 |
| 74 | 35.19 |
| 53 | 14.0 |
| 37 | 3.42 |
| fines | 17.3 |

BET surface area was measured to be approximately 37 m$^2$/g.

EXAMPLE III

The procedure of Example II was substantially repeated with the following exceptions:
PBI-DMAc feed: 248.8 cm$^3$/min at 65 psi;
Nitrogen feed (PBI-DMAc): 40 psi;
Water feed: 600 cm$^3$/min at 50 psi; and
Nitrogen feed (water): 10 psi.
The powder was recovered by centrifuging without prescreening and washed in hot water followed by centrifuging three times. Finally, the powder was dried in a planetary mixer at 1 atmosphere of N$_2$ for 22 hours at 200° C. A representative characterization of the powder is as follows:
Moisture content 11.5–12.7 wt. %
DMAC content: 0.5 wt. %
LiCl content: <20 ppm
BET Surface Area: 59 m$^2$/gm Mean Particle Size: <150 μm for 67.7% fraction

EXAMPLE IV

Following the procedure of Example I, a 50/50 w/w of PBI/Isaryl 25H (an aromatic polyester manufactured by Isonova Technische Innovationen G.m.b.H. of Austria) powders were dissolved in DMAc to form a solution containing 12 weight percent polymer solids. A 4.4 kg of the solution was atomized at a rate of 12.4 cm³/minute and a pressure of about 30 psi with the assistance of $N_2$ gas at a pressure of about 15 psi. The non-solvent, water, was fed to the nozzle at a rate of about 1080 cm³/min and a pressure of about 25 psi. The atomized polymers in solution contacted the atomized water to form polymer particles which were filtered, washed and dried. This powder was dried, moisturized and pressed into disks. Bulk density results are reported below in Table II. The particles exhibited a porosity ranging from about 0.69 to about 1.41 cm³/gm, and a surface area of about 81 m²/gm.

TABLE II

| 50 wt. % PBI/50 wt. % ISARYL 25 H ATOMIZED POWDER DISKS | |
|---|---|
| Applied Pressure, × 10³ psi | Bulk Density, gm/cm³ |
| 3 | 0.5057 |
| 5 | 0.6124 |
| 7 | 0.6952 |
| 9 | 0.8023 |
| 15 | 0.9052 |

Neat (e.g., relatively pure) Isaryl 25H solutions containing 12 and 15 weight percent polymer solids exhibit high viscosities at standard temperature and pressure conditions, i.e., about 60 and about 80 poise, respectively. Blends of PBI and Isaryl 25H solutions exhibit lower viscosities than either neat solution. Solutions containing dissolved PBI and Isaryl 25H in 1/1 weight ratio and containing total polymer solids contacts amounting to 12 and 15 weight percent has viscosities of 3 and 10 poise, respectively. Similar solutions having PBI and Isaryl 25H in 3 to 1 weight ratio had higher viscosities of 5 and 12 poise, respectively. Conversely, as the amount of PBI to Isaryl was increased to about 75 weight percent PBI, the viscosities of the 12 and 15 weight percent polymer solids solutions increased to about 5 and about 12 poise, respectively. The minimum viscosity of a blend of PBI and Isaryl 25H powders occurs at about 50/50 weight percent PBI to Isaryl 25H.

COMPARATIVE EXAMPLE A

As another comparative example, the procedure described in U.S. Pat. No. 4,628,067 to Chen et al., Example IV, was followed. This procedure was essentially that described above, except that the polymer solution was atomized onto a static bath of quench fluid. A 15% by weight solution of poly-2,2'-(m-phenylene)-5,5'-benzimidazole in DMAc was sprayed through a 0.16 nozzle utilizing air assistance at 30 psi at a rate of 0.5 gal/hr. into a methanol quench fluid static bath at ambient temperature. The nozzle was located 18 inches above the surface of the bath. Spherical PBI particles recovered from the static bath were filtered, washed and dried. The apparent densities of PBI powders prepared by this method was about 0.10 gm/cm⁻¹. The apparent densities of PBI powders made by various methods are presented for comparison below in Table III.

TABLE III

| PBI Powder Type | Apparent Density, gm/cm³ |
|---|---|
| Fibrid | 0.079 |
| Atomization, Static Quench Fluid | 0.10–0.11 |
| Atomization, Spray Quench Fluid | 0.14–0.18 |

Powders, especially polymer powders, are most useful in compression molding-type operations if they exhibit, among other desirable characteristics, high apparent density. Powders with high apparent densities can be compressed to maximum density with smaller compression ratios, i.e., the ratio of powder height in a mold before compression to the height after compression.

Unless otherwise indicated, apparent densities were measured in accordance with ASTM D-1895-89; commonly referred to as the loose bulk density of a powder. Polymer powders produced by gas-assisted atomization have different apparent densities depending on 1) the dope nozzle orientation with respect to the quench fluid, and 2) whether or not the quench fluid is atomized. High apparent densities result from the process of this invention if both the polymer solution and the quench fluid are atomized and caused to mix while both are suspended as droplets in air (or other gas) so that polymer precipitation occurs in this state of suspension. If the atomized polymer spray is quenched by directing it into a static quench fluid layer, a lower apparent density will result.

Very low apparent densities result if the quench fluid is not atomized and the polymer nozzle is submerged below the surface of the quench fluid. The polymer particles produced in this manner have a fibrid morphology and low apparent densities which greatly reduces their packing ability. Low apparent densities also result if the quench fluid is not atomized, i.e., the polymer nozzle is directed at a static quench fluid layer, as in the Chen et al. (U.S. Pat. No. 4,628,067, Example IV). Clearly, the PBI powder produced by the atomization-spray quenching process of the present invention displays a superior apparent density to PBI powder produced by the process of Chen et al.

What is claimed is:

1. A cold compactible powder capable of being compressed into shaped articles comprising a polybenzimidazole containing powder prepared by the process of forming a polymer solution in a solvent, and atomizing said solution into an atomized atmosphere of a non-solvent component to form a highly porous polybenzimidazole containing powder wherein said polybenzimidazole powder has an apparent density of from about 0.14 to about 0.300 gm/cm³, a compaction constant ranging from about 0.100 to about 0.500 MPa⁻¹, and a plasticizer content ranging from about 1 to about 25 weight percent.

2. The powder according to claim 1 having a porosity ranging from about 0.5 to about 1.5 cm³/gm, a surface area ranging from about 20 to about 80 m²/gm, a pore radius ranging from about 20 to about 600 Angstroms, a particle size ranging from about 1 to about 800 μm, and an angle of repose ranging from about 0 to about 40 degrees.

3. The powder according to claim 2 wherein the polybenzimidazole is poly-2,2'-(m-phenylene)-5,5'-bibenzimidazole.

4. The powder according to claim 1 wherein the powder comprises in combination polybenzimidazole resin and a resin selected from the group consisting of polybenzimidazolones, polybenzoxazoles, polyesters, polyimides, polyamides, polyamideimides, partial and wholly aromatic aramides, nylons of hexamethylene diamine and terephthalic acid, polyarylketones, polyarylsulfides and mixtures thereof.

5. The powder according to claim 4 which contains at least about 1 weight percent of polybenzimidazole solids.

6. The powder according to claim 1 which is compressed at a pressure ranging from about 3,000 to about 60,000 psi for a dwell time ranging from about 1 second to about 10 minutes.

7. The powder according to claim 4 which contains about 90 weight percent of polybenzimidazole.

8. The powder according to claim 1 which has been compacted into a shaped article and sintered.

9. The powder according to claim 1 having a plasticizer content ranging from about 5 to about 20 weight percent based on the total weight.

10. A shaped article made by compressing the powder according to claim 1.

11. A shaped article made by compressing the powder according to claim 3.

12. A shaped article made by compressing the powder according to claim 4.

13. A shaped article according to claim 12 wherein the polymer is a polyester.

14. A shaped article according to claim 13 which contains 50 weight percent of polybenzimidazole and 50 weight percent of polyester.

15. A cold compactible powder capable of being compressed into shaped articles consisting essentially of a polybenzimidazole resin prepared by the process of forming a polymer solution in a solvent, and atomizing said solution into an atomized atmosphere of a non-solvent component to form a highly porous polybenzimidazole powder said powder having an apparent density ranging from about 0.14 to about 0.18 gm/cm$^3$, a plasticizer content ranging from about 1 to about 25 weight percent, and a compaction constant ranging from about 0.100 to about 0.500 MPa$^{-1}$.

16. The powder according to claim 15 having a porosity ranging from about 0.5 to about 1.5 cm$^3$/gm, a surface area ranging from about 20 to about 80 m$^2$/gm, a pore radius ranging from about 20 to about 600 Angstroms, a particle size ranging from about 1 to about 800 μm, and an angle of repose ranging from about 0 to about 40 degrees.

17. The powder according to claim 16 wherein the polybenzimidazole is poly-2,2'-(m-phenylene)-5,5'-bibenzimidazole.

18. The powder according to claim 15 which is compressed at a pressure ranging from about 3,000 to about 60,000 psi for a dwell time ranging from about 1 second to about 10 minutes.

19. A shaped article made by compressing a powder according to claim 15.

* * * * *